United States Patent [19]

Sugie et al.

[11] 4,273,564
[45] Jun. 16, 1981

[54] AIR CLEANER OF INTERNAL COMBUSTION ENGINES

[75] Inventors: Hiromichi Sugie, Nagoya; Hajime Akado, Anjo; Akira Yamashita, Kariya, all of Japan

[73] Assignee: Nippondenso Co., Ltd., Kariya, Japan

[21] Appl. No.: 140,593

[22] Filed: Apr. 15, 1980

[30] Foreign Application Priority Data

May 30, 1979 [JP] Japan .............................. 54-72595[U]

[51] Int. Cl.³ .............................................. B01D 51/00
[52] U.S. Cl. ...................................... 55/267; 55/419; 55/DIG. 28; 123/556; 236/13
[58] Field of Search .......................... 55/267, 419–420, 55/DIG. 28; 123/552, 556; 236/13

[56] References Cited

U.S. PATENT DOCUMENTS

| | | | |
|---|---|---|---|
| 3,355,863 | 12/1967 | Pittsley | 55/510 X |
| 3,450,119 | 6/1969 | Sendelbach | |
| 3,459,163 | 8/1969 | Lewis | 55/419 X |
| 3,513,817 | 5/1970 | Kearsley | 55/510 X |
| 3,574,988 | 4/1971 | Buckman | 55/510 X |
| 4,077,787 | 3/1978 | Akado et al. | 55/267 X |

FOREIGN PATENT DOCUMENTS 2342156  4/1975  Fed. Rep. of Germany .
1373401 11/1974  United Kingdom ...................... 55/510

*Primary Examiner*—Kathleen J. Prunner
*Attorney, Agent, or Firm*—Cushman, Darby & Cushman

[57] ABSTRACT

An air cleaner of an internal combustion engine including an air inlet conduit connected to a main body containing a filter element and composed of upper and lower longitudinally extending conduit portions formed of a synthetic resin and connected together. The lower conduit portion is formed integrally with a heated air inlet port, and the upper conduit portion is formed integrally with a stepped flange for constituting a lower half portion of a housing of a vacuum motor. A cap is joined by supersonic melt adhesion or bonding to the stepped flange with an outer peripheral edge of a diaphragm being held therebetween, to provide an upper half portion of the housing of the vacuum motor. The diaphragm is connected at its upper portion to a valve body for opening and closing the heated air inlet port which is controlled by the vacuum motor of the diaphragm type.

5 Claims, 7 Drawing Figures

AIR CLEANER OF INTERNAL COMBUSTION ENGINES

BACKGROUND OF THE INVENTION

This invention relates to an air cleaner of an internal combustion engine including an air inlet conduit provided with a diaphragm type vacuum motor for controlling heated air supply.

In an air cleaner of an internal combustion engine of the type described, it has hitherto been customary to use a keep plate of a separate entity for assembling a vacuum motor so that the vacuum motor is inserted between the air inlet conduit and the keep plate and the air inlet conduit is secured to the keep plate by a bolt-and-nut arrangement. This constructional form of the prior art has had the disadvantages that the parts required, such as keep plate, bolt, nut, etc., are large in number, so that production cost is increased and the assembling is a time consuming operation.

SUMMARY OF THE INVENTION

This invention has as its object the provision of an air cleaner of an internal combustion engine including an air inlet conduit of simple construction, enabling assembling of a vacuum motor to be effected readily without requiring to use a keep plate, bolt and nut.

The outstanding characteristics of the present invention are that the air inlet conduit includes two conduit portions formed of a synthetic resinous material obtained by dividing the air inlet conduit longitudinally into two axial segments secured to each other, the lower conduit portion being formed integrally with a heated air inlet port and the upper conduit portion having formed integrally therewith a stepped flange constituting a lower half portion of a housing of the negative pressure motor. The flange has joined thereto by supersonic melt adhesion or bonding a cap which cooperates with the flange to hold therebetween an outer peripheral edge of a diaphragm so that the cap may serve as an upper half portion of the housing. The diaphragm is connected at its central portion to a valve body for opening and closing the heated air inlet port. Thus the housing of the vacuum motor can be provided by merely bonding the cap, by melt adhesion, to the flange of the air inlet conduit without requiring to use a keep plate, bolt, nut, etc., thereby facilitating assembling of the negative pressure motor and reducing production cost.

DESCRIPTION OF THE PREFERRED EMBODIMENT

Figure 1:
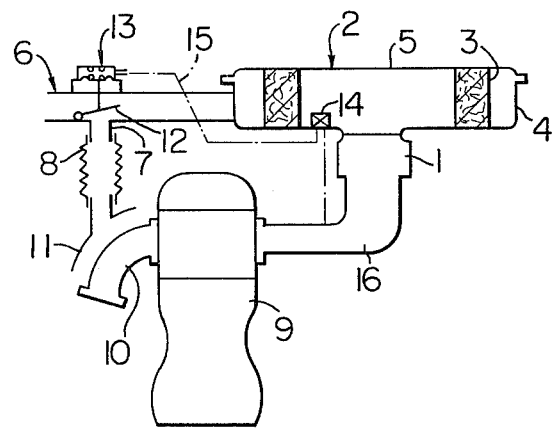
FIG. 1 is a schematic view of an air cleaner provided with an air inlet conduit of the prior art.

A preferred embodiment of the invention will now be described by referring to the accompanying drawings. FIG. 1 shows an air cleaner 2 of the prior art mounted on a carburetor 1, for example. The air cleaner 2 comprises a filter element 3, a main body 4 for containing the filter element 3 therein, and a cap 5 for sealing the main body 4. This construction is known. The air cleaner main body 4 has connected thereto an air inlet conduit 6 formed at its lower portion with a heated air inlet port 7 which is connected via a hose 8 to a shroud 11 located around an exhaust pipe 10 of an engine 9, so that air heated by the heat of the exhaust pipe 10 can be supplied to the air cleaner 2. To control the heated air supply, a valve body 12 for opening and closing the heated air inlet port 7 is provided and controlled by a diaphragm type vacuum motor 13 which is under the influence of negative pressure in a suction line 16 of the engine 9 through a line 15 by the action of a temperature sensor 14 mounted inwardly of the filter element 3. The aforesaid construction is known to one of ordinary skill in the art and further detailed description thereof is considered unnecessary.

Figure 2:
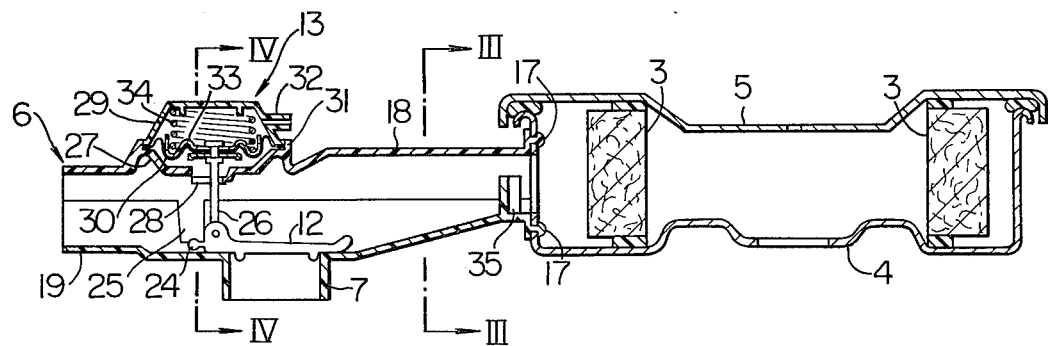
FIG. 2 is a vertical sectional view of the air inlet conduit according to the present invention.
Figure 3:
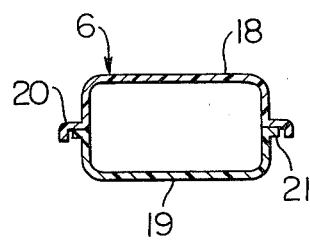
FIG. 3 is a transverse sectional view taken along the line III—III in FIG. 2.
Figure 3A:
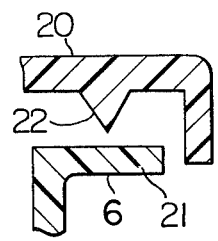
FIG. 3A is a fragmentary sectional view, shown on an enlarged scale, showing the manner in which the upper and lower conduit portions of the air inlet conduit according to the invention are joined together by melt adhesion.
Figure 4:
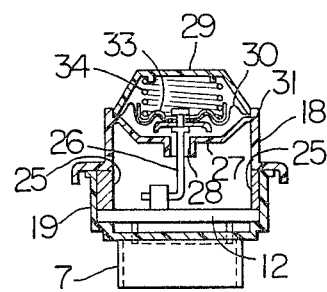
FIG. 4 is a transverse sectional view taken along to line IV—IV in FIG. 2.

Referring to FIG. 2, the air inlet conduit 6 is joined to the air cleaner main body 4 at 17 by supersonic melt adhesion, thermal crimping or bolting. As can be seen by referring to FIGS. 3 and 4 as well as FIG. 2, the air inlet conduit 6 includes conduit portions 18 and 19 obtained by dividing the conduit 6 longitudinally. The air inlet conduit 6 is formed of a synthetic resinous material (such as polybutylene terephthalate, 6-nylon, etc.) and has outwardly directed flanges 20 and 21 formed integrally along the side edges. The flanges 20 of the upper conduit portion 18 are each formed with a rib 22, for example, on the inner surface (See FIG. 3A), and the ribs 22 are crushed by supersonic melt adhesion to allow the flanges 20 and 21 to be joined together to provide the unitary air inlet conduit 6. Alternatively, the upper and lower conduit portions 18 and 19 may be bonded together by a bonding agent or secured together by means of clips.

Figure 5:
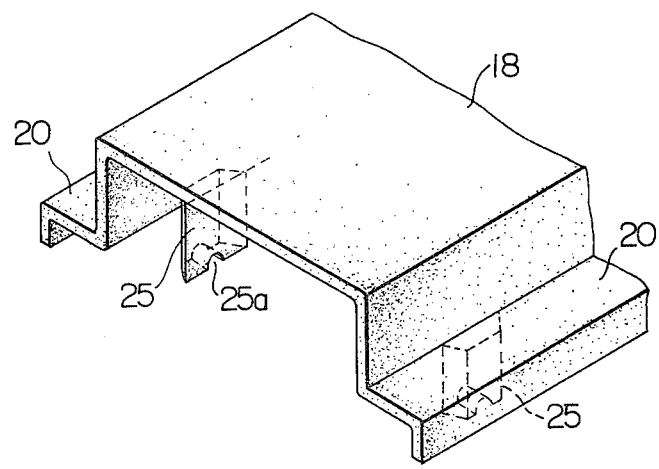
FIG. 5 is a fragmentary perspective view, on an enlarged scale, of the upper conduit portion of the air inlet conduit.
Figure 6:
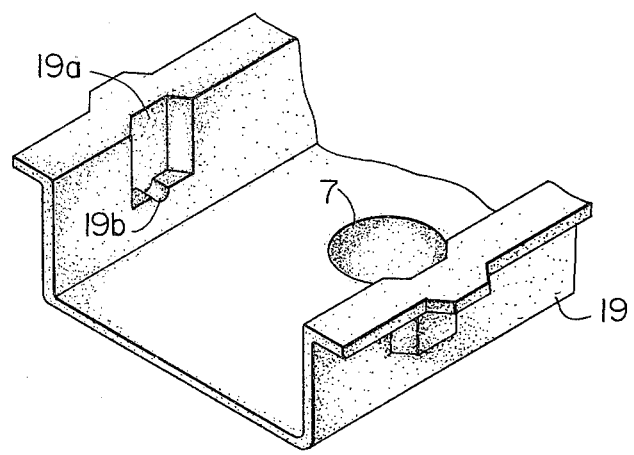
FIG. 6 is a fragmentary perspective view, on an enlarged scale, of the lower conduit portion of the air inlet conduit.

The lower conduit portion 19 is formed, as described hereinabove, integrally with the heated air inlet port 7 which is opened and closed by the valve body 12 which is connected at its rear end to a shaft 24 which in turn is supported for rotation by bearing members 25 downwardly projecting from the side edges of the upper conduit portion 18 and the inner surfaces of the lower conduit portion 19. FIGS. 5 and 6 show the arrangement more in detail. As shown, the bearing members 25 are secured to the inner surfaces of the flanges 20 of the upper conduit portion 18, and vertically extending recesses 19a are formed on the inner surfaces of side walls of the lower conduit portion 19. A semicircular notch 25a formed on the undersurface of each of the bearing members 25 and a semicircular notch 19b formed on the bottom of each of the recesses 19a cooperate with each other to form a completely circular hole when the upper and lower conduit portions 18 and 19 are assembled together, so that the opposite end portions of the shaft 24 (See FIGS. 2 and 4) can be fitted in these holes.

Referring to FIG. 2 again, the valve body 12 has one end of an operating rod 26 pivotally connected thereto in a portion thereof slightly anterior to the shaft 24. A baffle plate 35 is formed integrally with the lower conduit portion 19 in its rearward portion and extends crosswise thereof. The baffle plate 35 has the function of improving the performance of the filter element 3.

The upper conduit portion 18 has formed integrally therewith a stepped flange 27, constituting a lower half portion of the housing of the diaphragm type negative pressure motor 13, which has formed therein an opening 28 for the operating rod 26 to extend therethrough. A cap 29, which constitutes an upper half portion of the housing of the negative pressure motor 13, is joined by melt adhesion to an outer peripheral edge portion 31 of the flange 27 with an outer peripheral edge of a diaphragm 30 being held therebetween. The cap 29 may be bonded to the flange 27 by a bonding agent. The cap 29 which may be formed in one piece of a synthetic resinous material (such as polybutylene terephthalate, 6-nylon, etc.) has a mounting portion 32 for mounting the line 15 from the temperature sensor 14. The diaphragm 30 is connected at its central portion to the operating rod 26 via a plate 33. A spring 34 is mounted, as is well known, between the plate 33 and the inner surface of the cap 29.

As described hereinabove, the housing of the diaphragm type vacuum motor 13 can be formed by joining the stepped flange 27 of the upper conduit portion 18 to the cap 29 by melt adhesion or bonding, thereby reducing the number of parts, facilitating assembling and reducing production cost.

What is claimed is:

1. An air cleaner of an internal combustion engine comprising:

an air cleaner main body;
   an air inlet conduit fitted to said air cleaner main body and provided with a diaphragm type negative pressure motor, said air inlet conduit being formed of a synthetic resinous material and composed of an upper conduit portion and a lower conduit portion obtained by dividing said air inlet conduit longitudinally into two axially extending segments secured to each other;
   a heated air inlet port formed integrally in said lower conduit portion;
   a stepped flange formed integrally with said upper conduit portion to constitute a lower half portion of a housing of the negative pressure motor;
   a cap joined by supersonic melt adhesion to said stepped flange, with an outer peripheral edge of a diaphragm of said negative pressure motor being held therebetween, to constitute an upper half portion of the housing of the negative pressure motor; and
   a valve body disposed so as to open and close said heated air inlet port and connected to the central portion of the diaphragm.

2. An air cleaner as claimed in claim 1, wherein said lower conduit portion has formed integrally therewith a baffle plate located in a portion thereof which is near the end at which the air inlet conduit is fitted to the air cleaner main body.

3. An air cleaner as claimed in claim 1, wherein one of said upper conduit portion and said lower conduit portion has formed integrally therewith ribs located on its surfaces at which the two conduit portions are secured to each other and said conduit portions being secured to each other by supersonic melt adhesion.

4. An air cleaner of an internal combustion engine comprising:

an air cleaner main body;
   an air inlet conduit fitted to said air cleaner main body and provided with a diaphragm type vacuum motor, said air inlet conduit being formed of a synthetic resinous material and composed of an upper conduit portion and a lower conduit portion obtained by dividing said air inlet conduit longitudinally into two axially extending segments secured to each other;
   a heated air inlet port formed integrally in said lower conduit portion;
   a stepped flange formed integrally with said upper conduit portion to constitute a lower half portion of a housing of the vacuum motor;
   a cap joined to said stepped flange, with an outer peripheral edge of a diaphragm of the vacuum motor being held therebetween, to constitute an upper half portion of the housing of the vacuum motor;
   a valve body disposed so as to open and close said heated air inlet port and connected to the central portion of the diaphragm;
   a recess and a notch formed at the bottom of said recess on the inner surface of either side wall of said lower conduit portion; and
   a bearing member attached to the inner surface of either side wall of said upper conduit portion and formed at its lower end with a notch complementary with said notch formed at the bottom of said recess of the lower conduit portion, said two notches cooperating with each other to provide a bearing which rotatably supports said valve body.

5. An air cleaner as claimed in claim 4, wherein said lower conduit portion has formed integrally therewith a baffle plate located in a portion thereof which is near the end at which the air inlet conduit is fitted to the air cleaner main body.

* * * * *